P. E. HOLT.
AUTO TRACTOR.
APPLICATION FILED APR. 9, 1915.
1,200,110.
Patented Oct. 3, 1916.
3 SHEETS—SHEET 1.
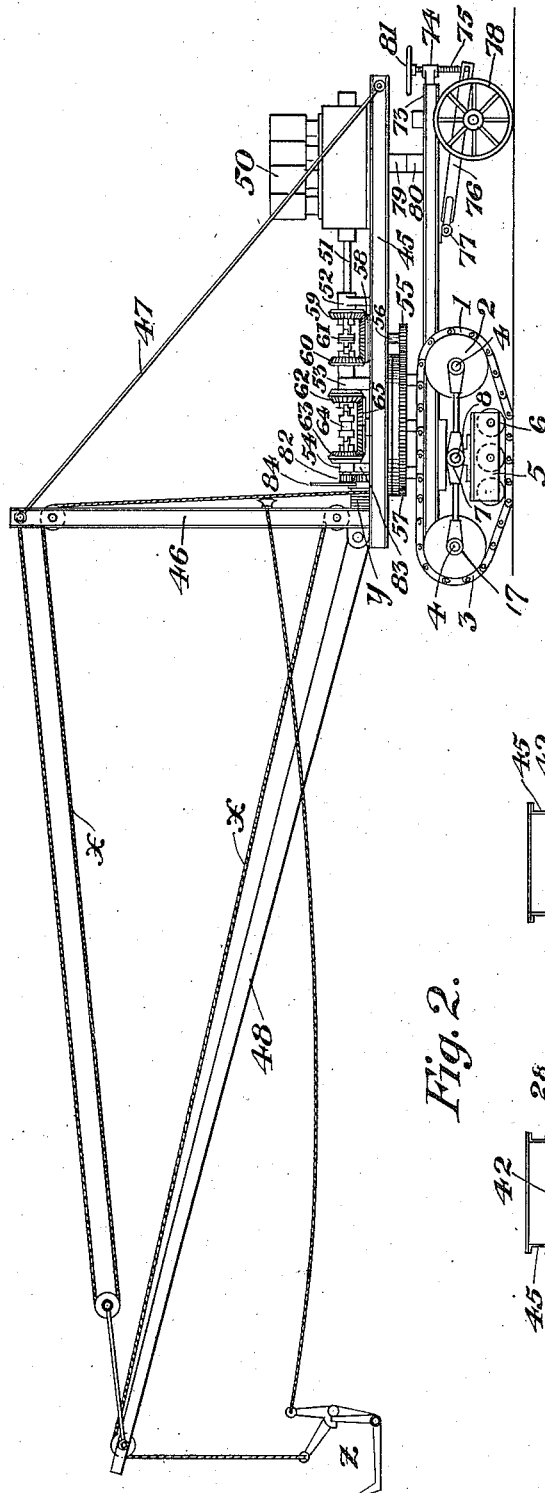
WITNESSES:
L. J. Forde
Thos. Castberg
INVENTOR
Pliny E. Holt.
BY G. H. Strong
ATTORNEY

P. E. HOLT.
AUTO TRACTOR.
APPLICATION FILED APR. 9, 1915.

1,200,110.

Patented Oct. 3, 1916
3 SHEETS—SHEET 2.

WITNESSES:
L. J. Forde
Thos. Castberg

INVENTOR
Pliny E. Holt.
BY G. H. Strong
ATTORNEY

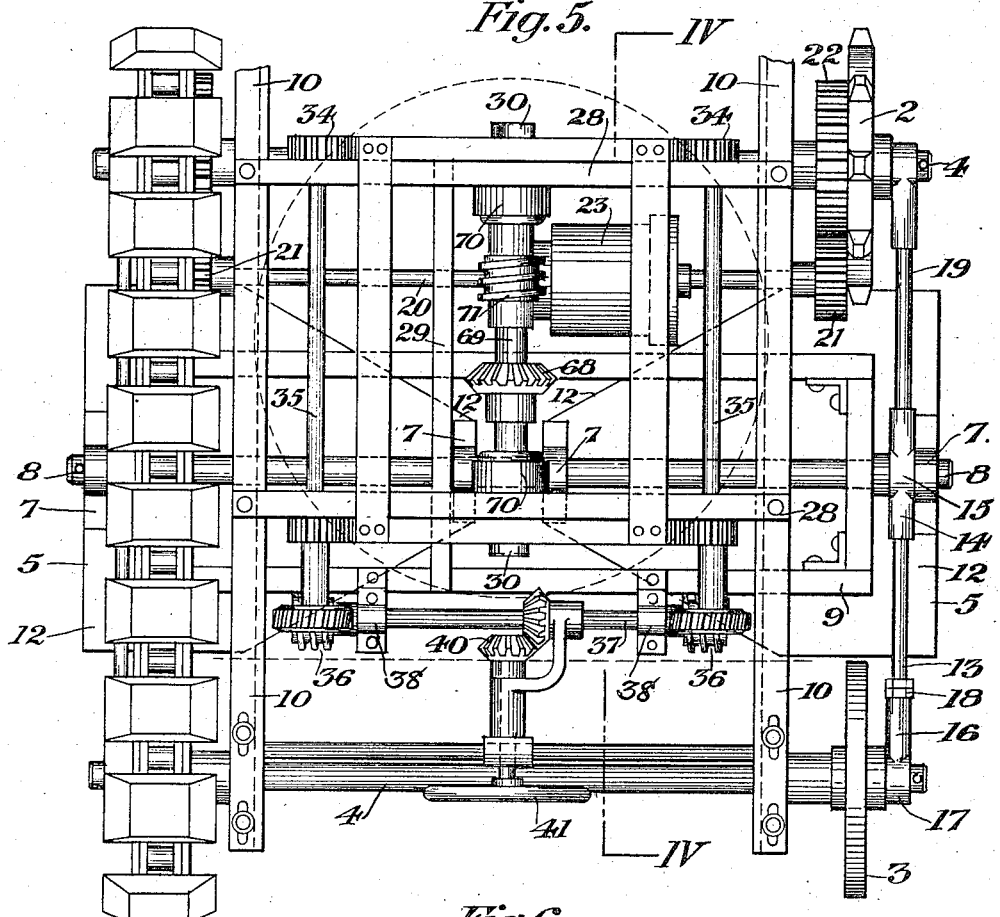

UNITED STATES PATENT OFFICE.

PLINY E. HOLT, OF STOCKTON, CALIFORNIA.

AUTOTRACTOR.

1,200,110.  Specification of Letters Patent.  Patented Oct. 3, 1916.

Original application filed September 18, 1913, Serial No. 790,574. Divided and this application filed April 9, 1915. Serial No. 20,205.

*To all whom it may concern:*

Be it known that I, PLINY E. HOLT, a citizen of the United States, residing at Stockton, in the county of San Joaquin and State of California, have invented new and useful Improvements in Autotractors, of which the following is a specification.

This invention relates to automobile tractors and pertains especially to tractors designed to support and operate traveling cranes and other mechanism requiring a turntable mounting; this application being a division of my original application Serial Number 790,574, filed September 18, 1913.

The invention consists of the parts and the construction and combination of parts as hereinafter more fully described and claimed, having reference to the accompanying drawings, in which—

Figure 3:
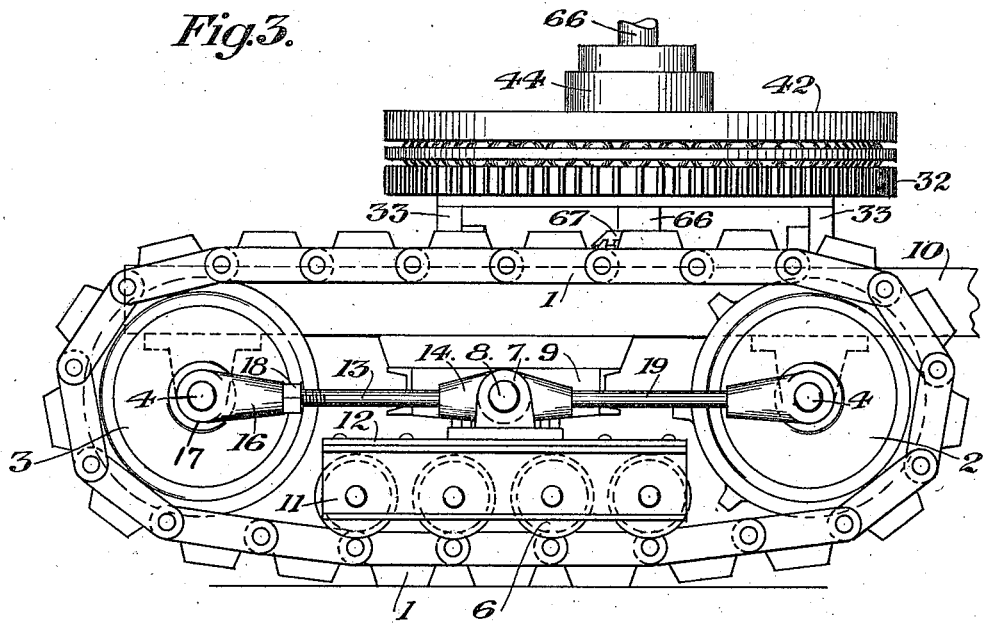
Figure 4:
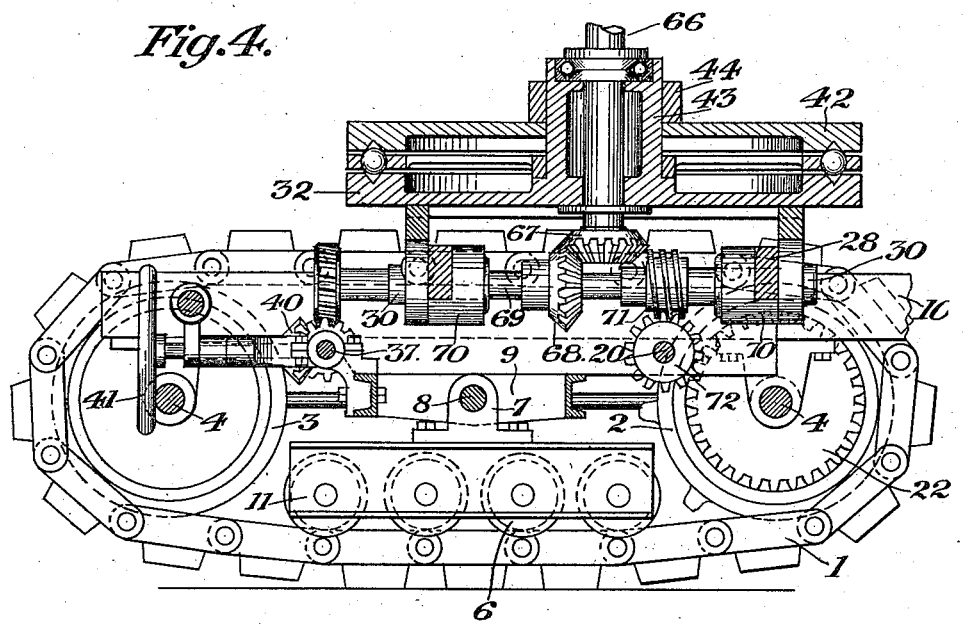

Figure 1 is a side elevation of a self-propelled traveling crane constructed in accordance with this invention. Fig. 2 is a diagrammatic rear elevation of the tractor element and turntable of the crane, showing the latter leveled in two opposite directions to the inclination of the tractor. Fig. 3 is a side elevation in enlarged detail of the tractor propulsion element or truck, showing the turntable of the crane mounted above it. Fig. 4 is a similar view of the same in vertical cross section taken on the line IV—IV of Fig. 5. Fig. 5 is a plan view from above of the traction truck with the turntable removed, disclosing the traction driving mechanism, the turntable leveling mechanism; one traction belt also is removed to disclose the traction transmission mechanism. Fig. 6 is a front end elevation of the turntable and associated leveling mechanism in detail. Fig. 7 is a rear end elevation of the same.

While I show and prefer the application of the endless belt form of traction mechanism for many obvious reasons, I do not wish, however, to be understood as limiting this invention to any particular form of traction mechanism, as the leveling crane may be applied to portable trucks, or to wheel driven tractors without departing from the spirit of the invention.

In detail the construction consists of the traction element preferably comprising the endless traction belts, 1, 1 encircling the toothed driving sprockets 2, 2, and the idlers 3, 3. These several sprockets are freely mounted upon axles, 4, 4 respectively, which are mounted on the main frame. The major portion of the weight is supported upon the supporting trucks 5, 5 in which are suitably journaled the supporting rollers 6, that roll upon the top of the ground portion of the traction belts 1, 1. The supporting trucks are pivoted at 7, 7 on the shaft 8 extending across the traction truck and mounted in the sub-frame 9, fixed to the side beams 10, 10 on both sides of the machine. The supporting trucks comprise the side beams 11 fixed to the top plates 12, 12. These top plates extend inward to near the center of the traction truck at which point they are pivoted upon the cross shaft 8. This inward extension of the top plates insures the proper horizontal alinement of the supporting trucks with respect to the plane of the traction belts, and the pivotal mounting allows a free oscillating vertical play or "teetering" of the trucks when the traction belts are passing over uneven road surfaces. The plates 12 can be of spring material to allow a limited accommodation of the trucks to the twisting of the traction belts. Elongation of the traction belts due to wear is taken up by the threaded push rods 13, 13 engaging the sockets 14, on the eye blocks 15, engaging the cross shaft 8 and threaded into the sleeves 16, on the eye blocks 17, engaging the ends of one of the axles 4; the threaded push rods 13 may be locked in adjusted position by the nuts 18. The push rods 19 are not adjustable, because the center of the other shaft 4 is fixed with respect to the differential pinion shaft 20 carrying the pinions 21, 21 enmeshed with the spur gears 22, 22 fixed upon the sprockets 2, 2 respectively. This pinion or jack shaft is provided with a conventional differential gear mechanism 23, to facilitate turning of the tractor.

The crane mechanism includes the cross beams 28, 28 fixed to the main frame, preferably over the traction trucks for the proper distribution of weight. To transmit the weight of the crane more directly to the supporting trucks the longitudinal support beam 29, is interposed between the hoist frame and the sub-frame. The trunnion studs 30, 30 mounted in the beams 28, 28 support the weight of the hoist through the turntable base 32 having the end plates 31, 31 pivoted upon the studs 30, 30; the base 32 constituting a rockable carriage for the turntable 42 all as will be shortly described.

The lateral leveling of the turntable base or rockable carriage 32, is accomplished through the leveling mechanism comprising the gear segments 33, 33, preferably formed in the plates 31, 31, enmeshed with the pinions 34, 34 fixed upon the shafts 35, 35, journaled in the cross beams 28, 28. These shafts are rotated by worm gears enmeshed with the gear worms 36, 36, fixed upon the cross shaft 37, journaled in the brackets 38, 38, fixed upon the traction frame. The shaft 37 is rotated by the bevel pinion 39 fixed thereon and enmeshed with the similar pinion 40, fixed upon a suitably mounted shaft that may be mechanically actuated, or provided with the hand wheel 41 for manual operation of the leveling mechanism.

By reference to Figs. 3 and 4 it will be seen that the rockable carriage 32 provides a suitable ball race or runway, for a concentric antifriction support for the turntable 42, both of which are centered by engaging the center column 43 of the carriage or turntable base around which they freely revolve, between the base and the collar 44 fixed upon the column.

The swinging frame 45 comprising suitable side beams fixed upon the turntable and suitably cross braced, forms the bed or foundation for the prime mover 50 and associate transmission mechanisms, clutches, and cable drums, etc. This swinging frame is provided with the conventional mast 46, stay rods 47, and the boom 48 stepped in the swinging frame, such as make up the conventional portable crane. This hoisting structure is provided with the usual sheaves, reeved with cables x, attached to winding drums y, and grappling devices Z, etc. Details of construction of the crane mechanism will vary with varying conditions to be met.

The prime mover 50, preferably an internal combustion motor, being the heaviest member is mounted upon the end of the swinging frame 45, opposite the crane, better to counterbalance the load lifted by the latter. The drive shaft extension 51, of the engine shaft is journaled in the bearings 52, 53 and 54. The frame 45 is swung by the pinion 55, fixed upon the vertical shaft 56, journaled in the swinging frame, this pinion being enmeshed with the rack teeth 57, cut in the turntable base. The upper end of the shaft 56 is fixed in the bevel gear 58. Two loose pinions 59 and 60 are enmeshed with the gear 58, on opposite sides, to form a reversing mechanism for swinging the swing frame. The sliding clutch 61 is splined on the shaft 51, and is adapted to be slid into and out of engagement with the loose pinions 59 and 60, which being on opposite sides of the bevel gear 58, will rotate it in either direction, according to the pinion engaged by the clutch driven by the drive shaft 51. A similar reverse gear drive for the traction mechanism is provided between the bearings 53 and 54, comprising the loose pinions 62 and 63 on the drive shaft 51, and the clutch 64 splined upon the same drive shaft, and adapted to be thrown into and out of engagement with either of said pinions. These pinions are enmeshed on opposite sides of the bevel gear 65, fixed upon the upper end of the vertical shaft 66, suitably journaled in the column 43 of the turntable base, preferably in vertical alinement with the axis of the studs 30, 30. The bevel gear 67 fixed upon the lower end of the shaft 66 is enmeshed with a similar gear 68, fixed upon the longitudinal shaft 69, journaled in the bearings 70, 70, mounted upon the cross beams 28, 28 respectively. The rotation of this shaft 69 is transmitted through the gear worm 71, fixed upon this shaft and enmeshed with the worm gear 72, fixed upon the differential shaft 20, geared to the driving sprockets of the traction belts, as previously described.

The said beams 10 extend to the point designated at 73, where they are joined to the bracket 74. The spindle 75 is threaded in the bracket 74, and swiveled in the front end of the steering truck 76, which is pivoted to the main frame beams at 77. The steering wheel or wheels 78 are mounted upon an axle suitably attached to the steering truck, and steered by a steering gear not shown, as steering may be accomplished in any suitable manner. The sliding support blocks 79 and 80 are interposed between the swing frame and the tractor main frame, to support the free end of the former as it swings about its pivot.

This invention operates substantially as follows: Presuming the scene of operation to be a sugar cane field, which in the tropics are largely hilly or uneven stretches of land, with low swampy areas intervening, or they may be deeply ridged or trenched, presenting a poor foundation for tractor or portable crane, the endless belt or "caterpillar" type of tractor is best adapted to these conditions. With the clutch 64 engaged, the power of the prime mover is transmitted to the traction mechanism, and the tractor proceeds to the desired location, probably along side of a temporary tramway in the field, on a hillside. It is manifestly impractical to operate a swing crane with the axis or mast at an inclination from the perpendicular; because, from the highest point of the plane of inclination, the load would swing laterally with great force, throwing undue strain on the mechanism, making the operation dangerous and generally unmanageable. With the tractor properly placed, under its own power, the turntable is leveled laterally, by turning the hand wheel 41, in the proper direction to rotate the pinions 34, engaging the racks 33, on the turntable base pivoted at 30. Usually lateral leveling only is sufficient, as the tractor can be placed to accomplish longitudinal leveling, approximately. The threaded spindle 75 operated by the hand wheel 81, interposed between the steering truck and the tractor main frame, provides a positive means for varying the height between the steering wheels and the front end of the tractor frame, to accomplish longitudinal leveling of the turntable, when necessary. This indirect leveling of the turntable longitudinally of the tractor is preferred, for the reason that direct leveling of the turntable in more than one plane, would unnecessarily complicate the transmission of power from the prime mover, through the turntable, to the traction mechanism beneath; although such universal leveling of the turntable is mechanically possible. With the turntable properly leveled, the clutch 61 is engaged to swing the turntable to bring the boom of the crane over the load to be handled. The load is supported in the grapple z, raised and lowered by the cable and winding drums, and placed by swinging the crane in an obvious manner.

The cable drum y is driven through the pinion 82, fixed upon the end of the drive shaft 51 and enmeshed with the gear 83, free upon the drum shaft; the drum being driven preferably by a friction clutch interposed between the drum and the gear 83, and controlled by the hand lever 84 in the usual manner.

Having thus described my invention what I claim and desire to secure by Letters Patent is—

1. The combination of a vehicle frame, a carriage mounted for oscillation in a direction transversely of the frame, a turntable on the rockable carriage, and a prime mover carried by the turntable with connections for rotating the turntable on the carriage, and means for raising and lowering the main frame longitudinally of the vehicle.

2. A main frame, a traction member, a shaft mounted on the main frame with connections for driving the traction member, a turntable on the main frame, means for tilting the turntable with respect to the frame to maintain the turntable horizontal irrespective of the character of the ground on which the machine sets, a prime mover carried by and movable with the turntable and drive connections between the prime mover on the turntable and the said drive shaft on the main frame.

3. A main frame, a traction member, a shaft mounted on the main frame with connections for driving the traction member, a turntable on the main frame, means for tilting the turntable with respect to the frame to maintain the turntable horizontal irrespective of the character of the ground on which the machine sets, a prime mover carried by and movable with the turntable and drive connections between the prime mover on the turntable and the said drive shaft on the main frame, and means to rotate the turntable from the prime mover.

4. In a vehicle, the combination of a main frame, means for leveling the main frame longitudinally of the vehicle, an auxiliary frame supported by the main frame, and means for leveling the auxiliary frame transversely of the vehicle.

5. In a vehicle, the combination of a main frame, front and rear ground supports for said main frame, means for raising and lowering one of said supports to level said main frame longitudinally of the vehicle, an auxiliary frame supported by the main frame, and means for tilting said auxiliary frame about an axis extending longitudinally with respect to the vehicle to level the auxiliary frame transversely on the main frame.

6. In a vehicle, the combination of a main frame, front and rear ground supports for the same, means for raising and lowering one of said supports to level the main frame longitudinally of the vehicle, a turntable supported by the main frame, and means for tilting said turntable about an axis extending longitudinally with respect to the vehicle to level the turntable transversely on the main frame.

7. The combination of a vehicle frame, a driving support for the same, a horizontally arranged transmission shaft geared with said driving support, a carriage mounted for oscillation relatively to the frame, in a direction transversely of the frame on an axis coincident with the axis of said transmission shaft, a turntable mounted in the rockable carriage, a motor carried by the turntable with connections for rotating the turntable in the carriage, a vertically arranged shaft geared with the motor and rotatable on an axis coincident with the axis of rotation of the turntable, and gearing intermediate said vertical shaft and the transmission shaft.

8. The combination of a vehicle frame, a driving support for the same, a horizontally arranged transmission shaft geared with said driving support, a carriage mounted for oscillation relatively to the frame in a direction transversely of the frame on an axis coincident with the axis of said transmission shaft, a turntable mounted on the rockable carriage, a motor carried by the turntable with connections for rotating the turntable on the carriage, a vertically arranged shaft geared with the motor and rotatable on an axis coincident with the axis of rotation of the turntable, gearing intermediate said vertical shaft and the transmission shaft, and means for raising and lowering said vehicle frame bodily at one end.

9. The combination of a main frame, a driving support for the same, a horizontally arranged transmission shaft, an auxiliary frame supported by the main frame, means for tilting said auxiliary frame relatively to the main frame on an axis coincident with the axis of the transmission shaft, a motor carried by the auxiliary frame, a vertically arranged shaft geared with the motor and extending through the auxiliary frame, and gearing intermediate said vertical shaft and the transmission shaft.

10. The combination of a main frame, a driving support for the same, a horizontally arranged transmission shaft, an auxiliary frame supported by the main frame, means for tilting said auxiliary frame relatively to the main frame on an axis coincident with the axis of the transmission shaft, a motor carried by the auxiliary frame, a vertically arranged shaft geared with the motor and extending through the auxiliary frame, gearing intermediate said vertical shaft and the transmission shaft, and means for raising and lowering the main frame bodily at one end.

In testimony whereof I have hereunto set my hand in the presence of two subscribing witnesses.

PLINY E. HOLT.

Witnesses:
 FRANK H. CHISHOLM,
 WILLIAM P. FERGUSSON.